United States Patent [19]

Burrer

[11] 3,978,281
[45] Aug. 31, 1976

[54] INFRARED IMAGING SYSTEM

[76] Inventor: Gordon J. Burrer, 5 Wayland Hills Road, Wayland, Mass. 01778

[22] Filed: Apr. 14, 1975

[21] Appl. No.: 567,939

[52] U.S. Cl............................ 178/7.7; 178/DIG. 8
[51] Int. Cl.².......................................... H04N 5/30
[58] Field of Search ............ 178/6, 6.8, 7.7, DIG. 3, 178/DIG. 8

[56] References Cited
UNITED STATES PATENTS

| | | | |
|---|---|---|---|
| 2,717,329 | 9/1955 | Jones et al. | 178/7.7 X |
| 3,704,342 | 11/1972 | Stoddard et al. | 178/6.8 |
| 3,794,762 | 2/1974 | Zukerman et al. | 178/6.8 |
| 3,804,976 | 4/1974 | Gard | 178/DIG. 8 X |
| 3,849,592 | 11/1974 | Rosenheck | 178/6 |
| 3,883,685 | 5/1975 | Yumde et al. | 178/6.8 |
| 3,895,182 | 7/1975 | Trilling | 178/DIG. 8 X |

*Primary Examiner*—Robert L. Griffin
*Assistant Examiner*—Aristotelis M. Psitos
*Attorney, Agent, or Firm*—Cesari and McKenna

[57] ABSTRACT

A TV compatible infrared imaging system employs horizontal and vertical oscillating scan mirrors which are driven in synchronism. The horizontal mirror oscillates at a fraction of the usual television horizontal scan rate while the vertical mirror is driven at the usual TV field rate. As the mirrors oscillate, the system scans back and forth across the scene being viewed, the radiation from that scene being imaged on an infrared detector. The radiance patterns from each oscillatory scanned horizontal line pair, one sweeping from left to right and the other sweeping from right to left are converted by a "line converter" to a pair of constant rate horizontal lines sweeping from left to right so that the output of the system can be applied directly to a conventional television recorder or receiver. Radiometric calibration of any point in the scene is achieved by sampling the incident radiation when the system is scanning that particular point within the scene and comparing it with the known temperature of a shutter placed momentarily in the optical path. The system also includes infrared optics optionally placed in the optical path to adapt the instrument to telescopic and microscopic applications.

9 Claims, 6 Drawing Figures

INFRARED IMAGING SYSTEM

BACKGROUND OF THE INVENTION

This invention relates to an infrared imaging system or imaging radiometer. It relates more particularly to an imaging system of the scanning type for providing a portrayal of the thermal characteristics of an object or scene being viewed.

Infrared imaging systems for night vision and radiometric mapping of scenes to provide thermal characteristics for both diagnostic and analytical purposes have been of general interest for over a decade. Systems such as this can provide excellent night vision in total darkness and can extend viewing distances beyond the usual visual ranges in haze or in the presence of light precipitation. Radiometric images are also used for early detection of diseases such as cancer. Industrially, the radiometric images can be used as a diagnostic to pinpoint from a remote location the site of and amount of thermal energy loss or generation.

In practice, however, the use and application of infrared imaging systems has been limited somewhat because of the high cost of these instruments and the cumbersome nature of the photographic "snapshot" data record that is typically generated by them.

The high cost of the prior systems has generally been due to some design combination of relatively large optics, complex scanning mechanisms, high performance detectors and/or custom displays designed to match the optical scan patterns developed by the systems. The cumbersome nature of the record stems from the fact that the data rate of the prior instruments is generally too high for standard audio tape recorders and is improperly formatted for standard television tape recorders or receivers. Therefore, the data record is typically made by exposing a Polaroid brand film as a scene is being scanned across the display. TV compatibility is often offered as an accessory option through use of an electronic scan converter, which must store a complete frame from the infrared scanner to permit conversion to a standard TV format. However, this accessory requires a large memory and is relatively large and expensive, when compared to the "line converter" described herein.

Further, the prior infrared systems have other drawbacks which make them relatively difficult to calibrate and operate and convert between telescopic and microscopic instruments.

SUMMARY OF THE INVENTION

Accordingly, the present invention aims to provide an infrared imaging system which is compatible with a conventional television format, foreign or domestic, so that the radiometric image can be viewed on a standard television receiver.

Another object of the invention is to provide an infrared imaging system of this type which provides a high information rate radiometric record of an object or scene.

Still another object of the invention is to provide a system of this type which can provide a permanent radiometric record on a standard video tape recorder (VTR) for real time playback.

Still another object of the invention is to provide a system of this type which is relatively easy to calibrate and operate.

A further object of the invention is to provide an infrared imaging system which is easily converted between a scanning camera, telescope or microscope as the situation demands.

Still another object is to provide an instrument of this type which is relatively easy and inexpensive to make and maintain.

Other objects will in part be obvious and will in part appear hereinafter.

The invention accordingly comprises the features of construction, combination of elements and arrangement of parts which will be exemplified in the following detailed description and the scope of the invention will be indicated in the claims.

Briefly, the present system employs small high duty cycle, low inertia, low power, horizontal and vertical oscillating scanning mirrors. The horizontal mirror is driven by an oscillatory function at a fraction, (say, one half or one quarter) of the usual television horizontal sweep frequency of 15,750 Hz while the vertical mirror is driven by the output of a standard TV sync generator at the usual TV field rate in synchronism with the horizontal mirror.

As the mirrors scan back and forth across the target, line-by-line, the incident radiation is imaged onto an infrared detector. The detector output signals representing the radiance pattern for each horizontal line pair, one of which sweeps from left to right and the other of which sweeps from right to left, are conditioned and applied to a line converter circuit.

During the first half of each oscillation cycle of the horizontal scan mirror (when the mirror is scanning from left to right), the radiation data for each resolution element in the line is read into a first memory. Then during the second half of the oscillation cycle (when the horizontal mirror is scanning the second line of the object from right to left), the radiation data is read into a second memory. Simultaneously, the information previously stored in the first memory is read out on a first-in, first-out basis, at the 15,750 Hz TV line rate, conditioned and summed with the signal from the TV sync generator, with the composite video signal then being applied to a standard television receiver or recorder.

During the first half of the next scanning cycle, the horizontal scanning mirror sweeps from left to right to develop intensity data for the third line in the TV raster and the information is loaded into the first memory. At the same time, the information already stored in the second memory corresponding to the second line in the raster is read out on a last-in, first-out basis, at the 15,750 Hz TV line rate, conditioned, summed with the signal from the sync generator and applied to the television receiver.

Thus, for a horizontal scan mirror rate of 7875 Hz (one half the 15,750 Hz rate), the electrical signals representing the radiation information for successively scanned lines of the TV raster are applied to the television receiver alternatively in the order that the line is swept out by the horizontal scanning mirror and in the reverse order thereof. In this fashion, the system sequentially stores the radiation information for the oscillatory scanned horizontal line pairs of the scene being viewed and converts them to constant rate left to right horizontal scan lines which are compatible with the standard TV raster.

The system also includes provision for introducing infrared telescope or microscope optics into the light path from the scene being viewed so that the system can respond to radiation originating at a distance or from a very small object close by as the need arises.

A radiometric calibration section can also be included in the system which allows the operator to determine the temperature of any point in the scene being displayed. This can be accomplished by moving the optical head to align a fixed cursor mark on the display with the target of interest or by cursor position controls on the system's front panel which allow the operator to select a point on the display for measurement. These cursor position controls apply a pair of d.c. voltage levels to a pair of comparators which also receive vertical and horizontal deflection voltages corresponding to the position of the electron beam in the television display. When these voltages exceed their corresponding d.c. levels indicating that the electron beam has reached the selected point in the display, the system momentarily samples and then holds the output of the infrared detector.

Immediately following this, a shutter which develops a voltage corresponding to the known temperature of the shutter is moved momentarily into the optical path being viewed and then compared with the previously stored output of the detector. The difference signal with a nonlinearity correction is then applied to a meter or super imposed on the display to indicate the absolute temperature of the selected point in the scene.

Thus, the present system can scan almost any object or scene and develop a standard composite video signal representing the radiometric image of that object or scene. Consequently, that image can be displayed on any standard television receiver and be permanently stored for later use on any standard video recorder. Furthermore, the radiometric map of the scene is available almost immediately and without resort to photography or other copying techniques. With all of these advantages, the present system is still relatively small and compact and relatively inexpensive to make. Therefore, it should prove to be a very practical and useful temperature measuring instrument. Also, since the instrument is easy to calibrate and operate, it should find wide use in both medical and industrial radiometric mapping applications.

BRIEF DESCRIPTION OF THE DRAWINGS

For a fuller understanding of the nature and objects of the invention, reference should be made to the following detailed description taken in connection with the accompanying drawings, in which:

FIG. 4 is a graphical representation of the deflection signal applied to the vertical scanning mirror in one embodiment of the FIG. 1 system;

FIG. 4A is a similar view of a segment of the FIG. 4 graph on a much larger scale.

DESCRIPTION OF THE PREFERRED EMBODIMENT

Figure 1:
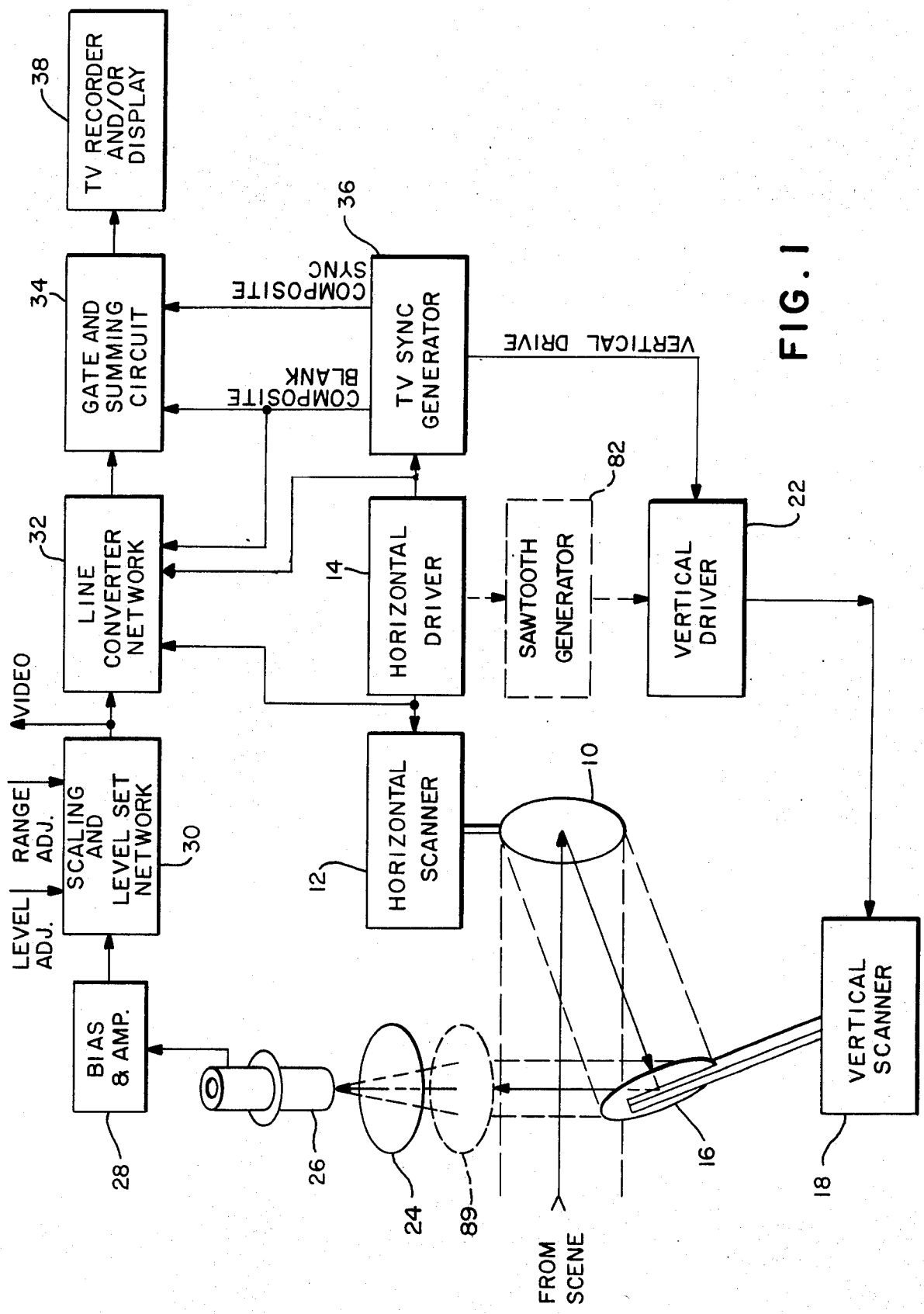
FIG. 1 is a block diagram of an infrared imaging system made in accordance with this invention.

Turning now to FIG. 1 of the drawings, infrared energy from the scene (not shown) is directed onto the reflective surface of a scanning mirror 10 which is an integral part of a horizontal oscillatory scanner 12. Scanner 12 is driven by a periodic signal from a driver 14 to cause oscillatory movement of mirror 10 in a predetermined angular sector which, in this diagram, is about a vertical axis. The infrared energy reflected from mirror 10 is incident on the reflecting surface of a vertical scanning mirror 16, which is part of an oscillatory scanner 18 energized by a driver 22. Scanner 18 causes oscillatory movement of mirror 16 in a predetermined angular sector which, in this diagram, is about a horizontal azis. Thus, scanner 18 oscillates mirror 16 at a predetermined rate to provide field scanning of the scene, while scanner 12 oscillates mirror 10 at a much higher rate to provide line scanning within each said field. Of course, if desired, the vertical mirror could precede the horizontal mirror in the optical path from the scene.

The horizontal scanner 12 is a low inertia, low power, relatively small electromechanical scanner which provides oscillating motion over a small sector of, say ± 7.5°. In one system embodiment, driver 14 powers the scanner at one-half the standard TV horizontal sweep frequency (i.e. 7875 Hz). In a second embodiment, the mirror is driven at one-fourth TV sweep frequency (i.e. 3937 Hz). The scanner 12 includes the usual feedback means such as described in U.S. Pat. No. 3,704,342 to provide phase stability so that the bidirectional scanning remains in phase to the required degree.

The vertical scanner 18 is also a low inertia, low power scanner which moves mirror 16 linearly by a sawtooth function providing a vertical deflection of, say, ± 5.625°. The vertical driver 22 drives the scanner at a frequency of 60 Hz. which is the vertical deflection frequency of a standard television receiver so that with interlacing the vertical frame rate is 30 Hz.

The infrared energy is reflected from mirror 16 through a fixed objective lens 24 to an infrared detector 26. Detector 26 can be any known variety having relatively fast response. A suitable detector is described, for example, in the above patent.

The detector 26 receives the infrared radiation from the target and provides electrical output signals proportional to the difference between the instantaneous scene radiation and the average background radiation. The detector output signals are applied to a bias control amplifier 28 which maintains the detector at optimum bias to permit it to function at maximum sensitivity. Typically, for optimum performance the amplifier 28 is located with the detector 26 in the instrument optical head.

The output of amplifier 28 is applied to a suitable scaling and level set network 30 such as shown in the above patent. Network 30 includes the usual front panel controls for level and range adjustments.

Thus, while the mirror 16 is scanning vertically downward at a uniform rate during the field period, the mirror 10 is oscillating back and forth so that during the first half of each cycle, it is scanning from left to right and during the second half of the cycle, it is scanning from right to left. This means that every other line of the scan sweeps in the opposite direction from a standard television raster which always sweeps from left to right.

To make the present system compatible with a standard television display, a special line converter 32 to be described in detail later converts the signals from the network 30 represents radiation data for the left-toright and right-to-left sinusoidal scan pattern for each cycle of mirror 10 to a pair of constant rate left-to-right scan lines of a standard TV raster.

The output of converter 32 is summed in a gate and summing circuit 34 with composite blank, equalization and synchronization signals from a standard TV sync generator 36. Generator 36 receives the periodic signals from driver 14, which also function as master sync pulses, for synchronizing generator 36 and thus the display 38. The generator also delivers a vertical sync signal to driver 22 to deflect mirror 16 vertically in synchronism with the horizontal deflection of mirror 10.

The output of the gate and summing circuit 34 thus constitutes a composite video signal which, with the scanning rates and deflections noted above, develops a picture frame having 525 lines at a frame rate of 30 frames per second. This standard television signal is then applied to a conventional television receiver and/or recorder 38.

Figure 2:
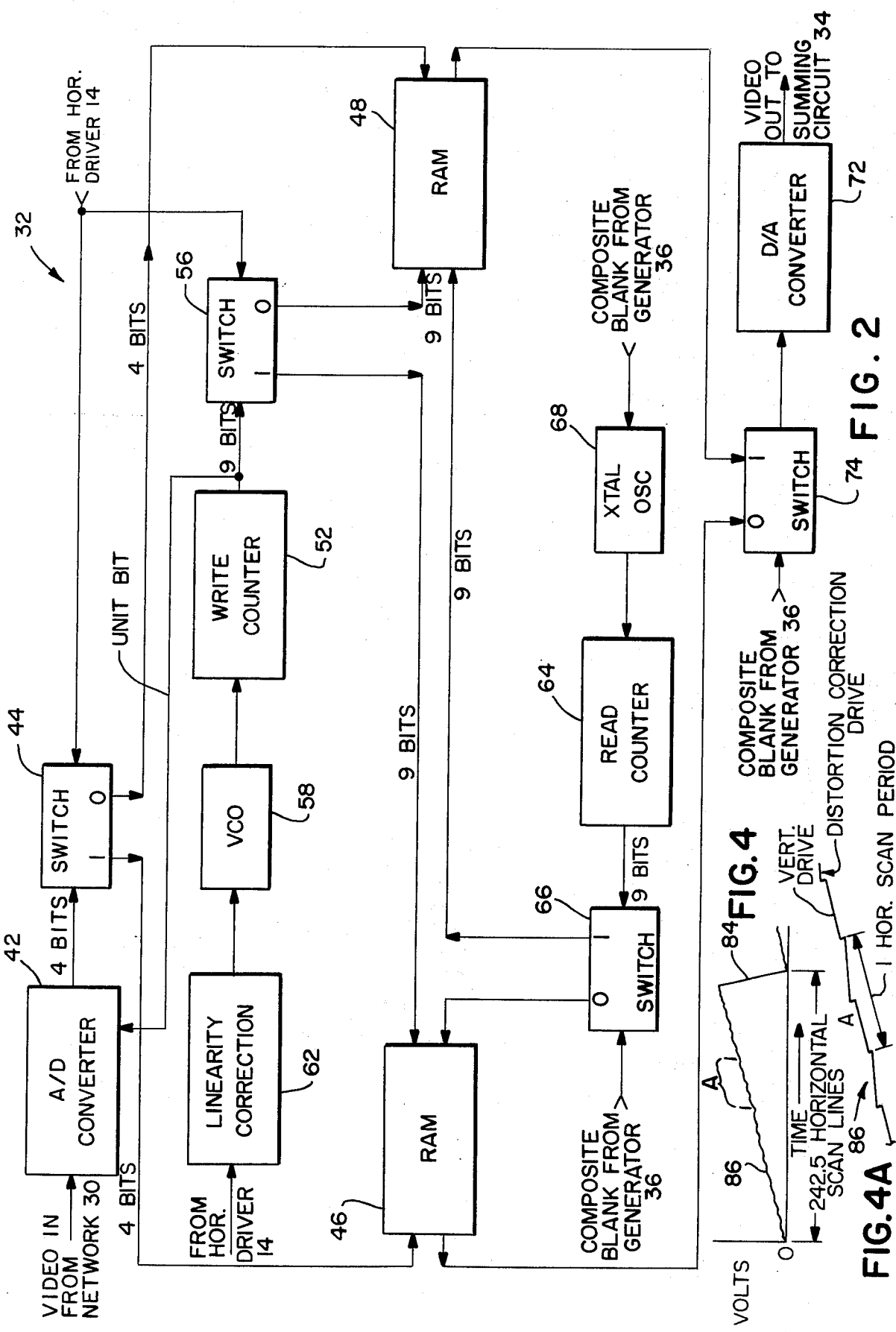
FIG. 2 is a block diagram illustrating part of the FIG. 1 system in greater detail.

Referring now to FIG. 2, with the system embodiment which operates at one-half the TV scan rate and uses a digital line conversion scheme, the line converter 32 comprises an analog-to-digital converter 42 which converts the signal from network 30 to a digital format consisting of four logic bits. The contents of converter 42 are applied by way of a switch 44 to either a random access memory (RAM) 46 or a second identical memory 48, depending upon the position of switch 44.

During a write sequence of each memory, that memory is closed and loaded by a nine bit word from a write counter 52. The contents of counter 52 is applied via a switch 56 to either memory 46 or memory 48, depending upon the position of switch 56. During each write sequence, the converter 42 is sampled by the unit bit from write counter 52.

The write counter 52 is, in turn, incremented by pulses from a voltage-controlled oscillator 58 driven by the periodic signal from horizontal driver 14 (FIG. 1) which is applied to it by way of a linearity correction circuit 62. Circuit 62 is essentially a non-linear function generator which compensates for the fact that the horizontal scanning mirror 10 scans at a variable rate while the electron beam in a standard television display scans horizontally at a linear rate. A suitable correction circuit for this purpose could be a ramp generator followed by a rectifier and break point nonlinear amplifier as described in classical electronic texts or literature.

Memory 46 and 48 is addressed during a read sequence by a nine bit word from a read counter 64 which is applied to memory 46 or 48 by way of a switch 66. Counter 64 counts pulses from a crystal oscillator 68 and the count in the counter is applied to one or another of the memories, depending upon the position of the switch 66. The contents of memory 46 or 48 is read into a digital-to-analog converter 72 via a switch 74 depending upon the switch position and the resulting analog signals are applied to the gate and summing circuit 34 (FIG. 1).

The switches 44, and 56, switch as a function of horizontal scan rate while switches 66 and 74 are switched by commands frame the sync generator 36 (FIG. 1).

During operation of the system, as mirror 10 begins to scan from left to right during the first half of its first oscillation cycle, assume the four switches 44, 56, 66 and 74 are in their ONE states. During this first half-cycle, the data corresponding to the radiation intensity of successive resolution elements in the $n$th scene line being scanned is loaded via switch 44 into memory 46. At the same time, the data for the resolution elements swept out during the return scan of the previous half-cycle of mirror 10 as it was scanning the $(n-1)$th scene line from right to left is read out of memory 48 into converter 72 on a first-in, last-out basis. The analog is applied as part of the composite video to receiver 38 and develops the $(n-1)$th line of the TV picture field.

After completion of the left-to-right sweep of mirror 10 (corresponding to one-half cycle of mirror oscillation and the end of the $n$th scan line of a conventional television raster), signals from sync generator 36 and horizontal driver 14 (FIG. 1) switch all four switches 44, 56, 66, and 74 to their ZERO states. Now the radiation data for the successive resolution elements scanned by mirror 10 as it makes its $(n+1)$th sweep across the scene from right to left is loaded into memory 48. At the same time, the radiation data for the $n$th line or sweep previously stored in memory 46 is read out of that memory into converter 72 on a first-in, first-out basis. This information is converted to an analog signal which comprises the composite video signal for the $n$th horizontal scan line in the TV picture field.

After one complete oscillation of mirror 10 (corresponding to two horizontal scan lines in the television picture, i.e. with interlacing, lines $n$ and $n+2$), other blanking signals from generator 36 and driver 14 switch the switches 44, 56, 66 and 74 to their original positions indicated in FIG. 2 so that the radiation data covering the first half of the next oscillator of mirror 10 is written into memory 46, while the data stored in memory 48 during the previous half-cycle of mirror oscillation is recovered on a first-in last-out basis at the output of converter 72.

This process continues with the target being scanned bi-directionally in the horizontal direction and unidirectionally in the vertical direction. The radiation information for the first half of each oscillation of mirror 10 is stored in memory 46, while the radiation information for the return sweep of mirror 10 is stored in memory 48. Both memories are operated in tandem so that as data is being loaded into one, information is being read from the other and applied as part of the composite video signal to display, with interlace, the odd-numbered lines of the picture frame displayed by receiver 38. After 1/60 second, corresponding to 262.5 lines, the sawtooth function applied to the vertical driver 22 (FIG. 1) returns the mirror 16 to the top of the scene being scanned while, at the same time the generator 36 applies a vertical sync signal to the receiver 38 to commence scanning the interlaced even-numbered lines of the same picture frame. After 1/30 second the first frame consisting of 525 lines is completed and the system commences sweeping out the next frame in the same fashion, and so on.

Thus, the present system rapidly scans the target and develops a composite video signal which is compatible with any conventional television receiver or recorder. Consequently, through a standard VTR a permanent radiometric image of the target is immediately available at relatively low cost.

Instead of using random access memories for the storage of information in the line converter 32, a serial analog memory could just as well be used which would eliminate the need for the converters 42 and 72. Alternately, a conventional double-ended or a pair of single-ended storage tubes can be employed for that purpose.

Referring now to FIGS. 4 and 4A, the left-to-right, right-to-left line pair scan pattern of the mirror 10 will cause some distortion of the radiometric picture after conversion by the line converter 32 to a pair of left-to-right horizontal lines in the television raster. This distortion occurs because the scan line produced by the mirrors 10 and 16 during the first half of the mirror 10 oscillatory cycle skews downward from left to right. Then, during the second half of the cycle, i.e. the return sweep of the mirror, the scan line skews downward from right to left. On the other hand the scan lines in a conventional television raster always scan downward from left to right.

In those applications requiring a high information rate, say more than 200 vertical lines in the radiometric scene, this distortion can be minimized by superimposing a low amplitude, sawtooth-type wave function having twice the frequency of the mirror 10 scan frequency on the sawtooth waveform driving scanner 18. This may be provided by a standard sawtooth generator which is indicated in dotted lines at 82 in FIG. 1. The generator is triggered by the output of driver 14 and applies the sawtooth-type wave function to driver 22.

FIG. 4 illustrates a typical sawtooth waveform 84 on which is superimposed a suitable low amplitude relatively high frequency sawtooth 86. A segment of that waveform indicated at A is illustrated on a greatly enlarged scale in FIG. 4A. As seen from that figure, during the first half of the scan period, the offset waveform 86 is applied which causes the scanner 18 to tilt mirror 16 during its right-to-left scan so that the return scan lines are cocked sufficiently to render them substantially parallel to the left-to-right scan lines.

In another embodiment, this same distortion correction can be accomplished with a third mirror 89 shown in dotted lines in FIG. 1, with the small amplitude correction shown in FIG. 4A. This third mirror would be located between the vertical mirror 16 and the objective lens 24, its axis of rotation being parallel to the axis of rotation of the vertical mirror 16. The advantage of the third mirror is that it will have less inertia than the vertical scan mirror and therefore can respond better to the high frequencies in the correction drive function.

In some applications, it may be desirable to operate the system at one-quarter of the TV horizontal sweep frequency, i.e. at about 3937 Hz. This allows one to use larger optics and/or larger scan angles. Resultantly, the basic scanner can have a higher information rate, i.e. more resolution elements per picture frame.

In this lower frequency scanning system, the line converter 32 shown in FIG. 2 has a first-in, first-out memory 46 with a nondestructive read and a first-in, last-out memory 48 also with a nondestructive read. During a write sequence, when the mirror 10 is scanning the scene from left to right, the counter 52 addresses memory 46 so that the data from converter 42 is loaded into memory 46.

At the end of the first sweep of mirror 10, the various switches 44, 56, 66 and 74 assume their other positions as described above so that the radiation data detected during the return sweep of mirror 10 is applied to memory 48.

While that information is being written into memory 48, data is simultaneously being read out of memory 46 also as described above. During the first half of the return sweep of mirror 10, the information in memory 46 is applied to converter 72 to provide the video information for the first line of the television picture. Then when the number in counter 64 corresponds to the mirror 10 position midway across the target, a decoder in memory 46 decodes that number and repeats the address numbers from the counter to memory 46. Resultantly, the contents of that memory are applied to the display while the second line on the television raster is being swept out. Memory 46, then, is read twice during the right-to-left half-cycle of mirror 10.

The same procedure is followed for the read sequence of memory 48. As data is being read from memory 48, new data is being loaded into memory 46 corresponding to the next sweep of mirror 10. This process continues for the remainder of the picture field so that, although the mirror 10 is scanning at a relatively low rate, the resultant output from the system consists of a composite video signal which is still compatible with a conventional television receiver which scans horizontally at a four times higher rate.

In some applications, it may be desirable to use an optical head having two detection elements in detector 26 so that two sets of line pairs of different resolution elements can be scanned during each cycle of mirror 10. In this event, of course, an additional memory like 46 and like 48 would be required for the second detector. Utilization of multiple detectors increases the system's information rate. On the other hand, it also increases its overall cost.

The resolution and performance of the system can also be improved by adding additional elements in detector 26 oriented in the scan direction as disclosed in U.S. Pat. No. 3,723,642. Again, these additional detectors would require additional memory capacity.

Since the present infrared scanning system is completely compatible with a standard television receiver or recorder, it is a relatively easy matter to superimpose characters or other information on the radiometric display. These characters may indicate times, temperatures, locations, target identities, etc. Any known character generator can be employed for this purpose. A suitable one whose output is completely compatible with the standard TV format is disclosed in U.S. Pat. No. 3,345,458. If such a generator is used, its output is simply summed along with the composite video signal from circuit 34 (FIG. 1) being applied to display 38.

Figure 5A:
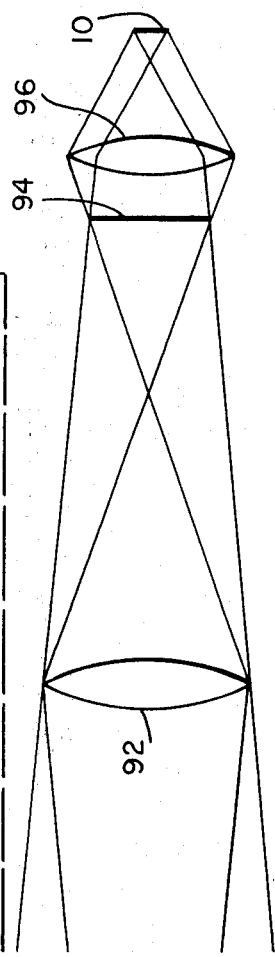
FIGS. 5A and 5B are diagrammatic views of infrared optics for use with the FIG. 1 system.

FIG. 5A illustrates a conventional afocal telescope that can be used in conjunction with the present instrument and positioned between the target and mirror 10. The telescope has an objective lens cell 92, a field stop 94 which can also be used as a calibration source, and a collimater lens cell 96. Cell 96 matches the output optical bundle to the field of view of the basic scanner.

Figure 5B:
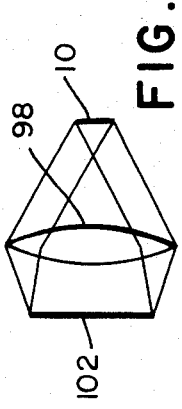

FIG. 5B, on the other hand, illustrates a compatible microscope lens optical system. This system employes a collimator lens 98 with the image plant at 102. A compound microscope can also be used which would have an objective cell similar to the one in the telescope shown in FIG. 5A.

Desirably, the present system is also provided with a radiometric calibration section which allows the operator to determine the absolute temperature of any point on the target.

Figure 3:
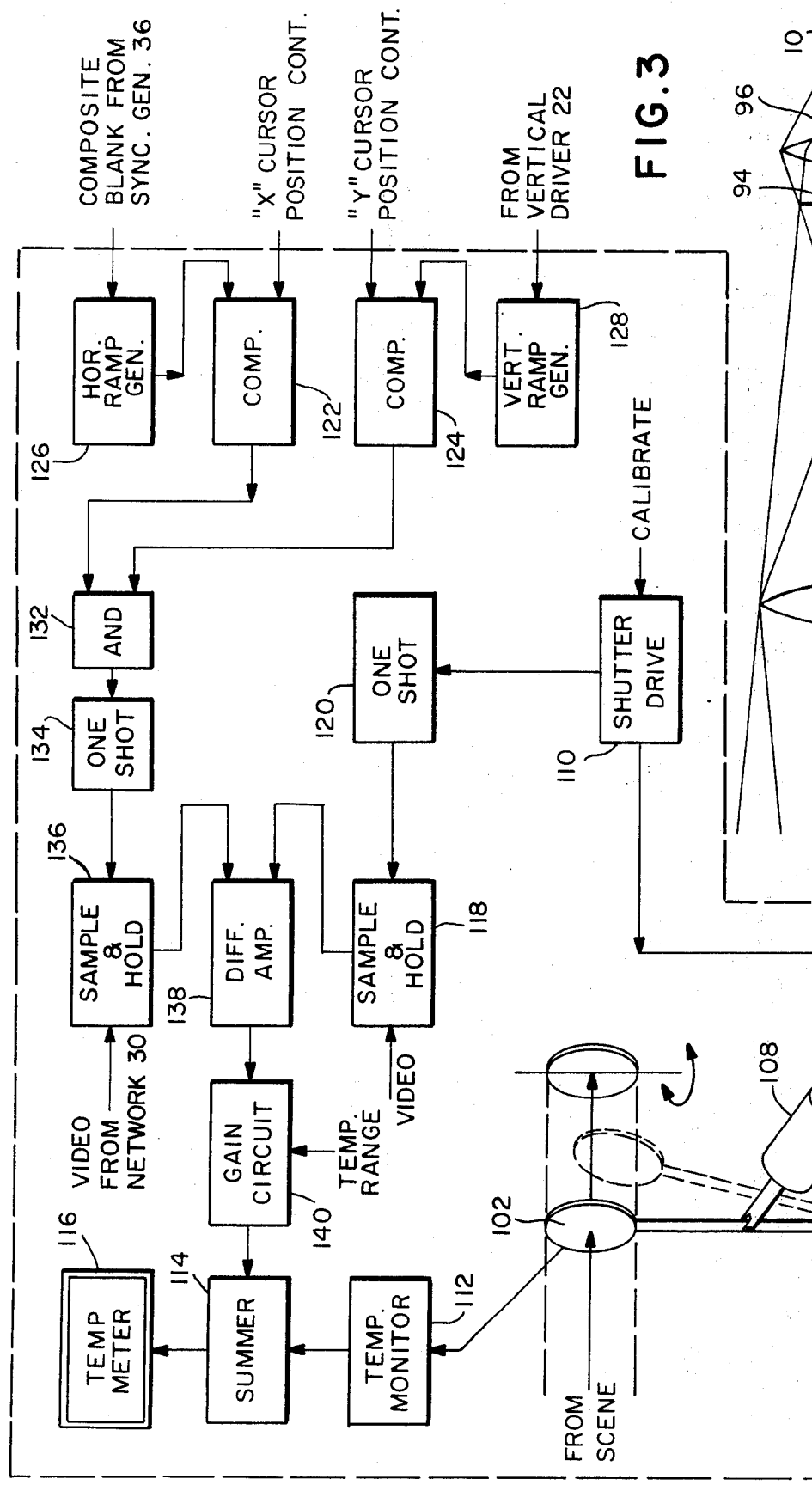
FIG. 3 is another block diagram particularizing a calibration section for use with the FIG. 1 system.

FIG. 3 shows a particularly desirable calibration system which takes advantage of the a.c. gain stability which is typical for these types of systems. It comprises a known temperature shutter 102 connected to the instrument frame by a pivot 104 and linked to an actuator 108 which can move the shutter rapidly in and out of the optical path ahead of the optical scanning mirror 10. Actuator 108 is driven by a shutter drive 110 that is triggered when the operator depresses a front panel CALIBRATE button.

A temperature monitor 112 monitors the shutter 102 temperature and develops a corresponding electrical signal which is applied via a summing circuit 114 to a temperature meter or display 116. The video signal from network 30 (FIG. 1) is applied to a sample and hold circuit 118 which is enabled by a pulse from a one-shot 120 triggered by the output of the shutter drive 110. Thus, during a calibrate sequence, the shutter is moved into the optical path and the output of network 30 representative of the temperature of the shutter 102 is stored in circuit 118.

The calibration section, for the embodiment illustrated in FIG. 3, also includes a pair of comparators 122 and 124. A horizontal ramp generator 126 which is triggered by pulses from sync generator 36 (FIG. 1) is applied to comparator 122, while comparator 124 receives the output of a vertical ramp generator 128 that is triggered by pulses from vertical driver 22 (FIG. 1). Comparator 122 compares the output of generator 126 with a d.c. signal provided by an X cursor position control. The d.c. level of the position control is set by a joy stick or other comparable device. Similarly, comparator 124 compares the output of generator 128 with the d.c. output of a manually adjustable Y cursor position control. The movement of the cursor position controls also causes corresponding movement of a cursor marker on the display screen as is well known in the display art.

The outputs of comparators 122 and 124 are applied to an AND circuit 132. When the comparator outputs coincide, a pulse from AND circuit 132 triggers a one-shot 134. The output pulse from one-shot 134 gates a sample and hold circuit 136 which thereupon samples the video signal from network 30 (FIG. 1). The contents of the sample and hold circuit 136 is then applied to a differential amplifier 138 along with the contents of sample and hold circuit 118. The difference signal from amplifier 138 is thereupon applied via non-linear gain circuit 140 which functions as a range set to network 114. There it is summed with the output of monitor 112 and applied to meter 116 which thereupon displays the absolute temperature of the target point in the scene.

When the operator desires to obtain the temperature of a particular target in the scene being viewed, he adjusts the X and Y cursor position controls to align the cursor marker with the point of interest on the display 38. This applies d.c. signals to comparators 122 and 124 which represent the selected point on the scene being displayed. The comparators 122 and 124 thereupon apply output signals to an AND circuit 132 when the horizontal and vertical ramps exceed the d.c. levels set by the X and Y cursor position controls.

Upon the occurrence of these coinciding signals, AND circuit 132 triggers the one-shot 134 which thereupon causes circuit 136 to sample the output from network 30 (FIG. 1) at that instant, which output represents the infrared temperature of the selected target point.

The operator then depresses the CALIBRATE button which causes the shutter drive 110 to move the shutter 102 into the optical path. The shutter drive also triggers the one-shot 120 which thereupon causes the sample and hold circuit 118 to store the electrical analog of the temperature of the shutter. This is applied to the differential amplifier 138 and the difference signal is summed with the output of monitor 112. Consequently, the reading on meter 116 reflects the absolute temperature of the target point.

Of course, provision can be made for superimposing the temperature reading as well as the cursor position on the video recording tape in the TV recorder and/or display 38 (FIG. 1).

Also, if the instrument responsivity (a.c.) gain is not stable, a second shutter of different temperature may be required in order that the a.c. gain of the instrument can properly be monitored and/or controlled. However, with the assumption of constant a.c. gain, the single temperature shutter 102 is sufficient to obtain adequate calibration of the instrument's video output.

Furthermore, instead of using the cursor position control arrangement, the operator can manually align the instrument's optical head so that a cross hair marked on the screen of the display 38 (FIG. 1) falls on the target point of interest. This would simplify the overall instrument and reduce its cost.

Thus, the present infrared imaging system is quite versatile in that it can generate radiometric images of distant scenes or close up objects. Furthermore, the scene or map can be displayed immediately on a standard television receiver. The instrument is constructed using, for the most part, standard electrical components and, therefore, its cost and complexity are kept to a minimum. Furthermore, with its built-in calibration section, the instrument can yield the absolute radiometric temperature of any selected point on the scene being viewed and this information can be recorded and/or displayed along with the radiometric scene information. With all of these advantages, the present system should prove to be a very useful and versatile infrared sensing and measuring tool.

It will thus be seen that the objects set forth above, among those made apparent from the preceding description, are efficiently attained and, since certain changes may be made in the above description without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

I claim:

1. An infrared energy system comprising:
  A. a low inertia horizontal scanning mirror positioned in the optical path from a scene,
  B. means for oscillating the horizontal scanning mirror in resonance at a frequency which is an even submultiple of a standard television horizontal line frequency,
  C. a low inertia vertical scanning mirror,
  D. means for driving the vertical scanning mirror in synchronism with the horizontal scanning mirror so that the scene is scanned in a zig-zag pattern from top to bottom,
  E. infrared detecting means positioned beyond the miirrors in the optical path from the scene, said detecting means generating an output representative of the intensity of received infrared energy from the scene,
  F. line converting means
    1. synchronized to the fundamental frequency of the horizontal scanning mirror, 2. for receiving the output of the detecting means, and
3. alternately
   a. for storing the output of the detecting means corresponding to the resolution elements in the scene which are scanned in an oscillatory time variant function by the horizontal scanning mirror, and
   b. for transmitting said stored output at a constant resolution element rate left-to-right pattern that is synchronized to the fundamental frequency of the horizontal scanning mirror, and
G. means for delivering the transmitted output of the line converting means as part of a composite video signal to a television receiver operating at said standard horizontal line frequency.

2. The system defined in claim 1 and further including an infrared objective lens assembly positioned in the optical path ahead of said mirrors for enabling the system to function alternatively as an infrared telescope and microscope.

3. The system defined in claim 1 wherein the oscillating means oscillates the horizontal scan mirror at one-half of the standard television line frequency.

4. The system defined in claim 1 wherein the horizontal scanning mirror oscillates at one-quarter of the standard television line frequency.

5. The system defined in claim 1 and further including function generating means responsive to the oscillating means for applying a relatively high frequency periodic signal to the driving means to introduce a correction in the motion of the vertical scanning mirror when the horizontal scanning mirror is moving from right to left.

6. The system defined in claim 1 wherein the line converting means comprise
A. first data storage means,
B. second data storage means,
C. means for applying the output of the detecting means to the first data storage means when the horizontal scanning mirror is moving in one direction,
D. means for applying the output of the detecting means to the second data storage means when the horizontal scanning mirror is moving in its opposite direction,
E. means for applying the contents of the first data storage means to the delivery means when the horizontal scanning mirror is moving in its said opposite direction, and
F. means for applying the contents of the second data storage means to the delivery means when the horizontal scanning mirror is moving in its said one direction.

7. The system defined in claim 6 wherein the first and second data storage means comprise random access memories.

8. The system defined in claim 7 wherein said applying means comprise counters synchronized to said oscillating means.

9. The system defined in claim 1 and further including means for determining the temperature of a selected target in the scene being scanned by said mirrors, said temperature determining means comprising
A. an infrared standard,
B. means for selectively moving said standard into the optical path from the scene being scanned by the mirrors,
C. means for sampling the output of the detecting means at a selected point in said scene scanning pattern corresponding to said selected target,
D. means for comparing a said output sample taken when the standard is moved into the light path with a said output sample when the standard is not in the light path, said comparing means thereupon developing an indicating signal representing the temperature of said target, and
E. means responsive to the indicating signal for displaying the target point temperature.

* * * * *